United States Patent
Min et al.

(10) Patent No.: US 11,941,637 B2
(45) Date of Patent: Mar. 26, 2024

(54) ELECTRONIC APPARATUS FOR PROCESSING ITEM SALES INFORMATION AND METHOD THEREOF

(71) Applicant: Coupang Corp., Seoul (KR)

(72) Inventors: Zee Young Min, Seoul (KR); Ki Hyun Jeong, Seoul (KR); Il Hyun Seo, Seoul (KR); Hyun Ju Cho, Seoul (KR); Jin Hwan Kim, Seoul (KR); Hyun Yong Jung, Seoul (KR); Min Yong Yuk, Seoul (KR); Ho Hyun Lim, Seoul (KR); Jin Hyuk Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/209,696

(22) Filed: Mar. 23, 2021

(65) Prior Publication Data
US 2022/0284430 A1 Sep. 8, 2022

(30) Foreign Application Priority Data
Mar. 3, 2021 (KR) .......................... 10-2021-0028282

(51) Int. Cl.
*G06Q 20/40* (2012.01)
*G06Q 40/03* (2023.01)

(52) U.S. Cl.
CPC ....... *G06Q 20/405* (2013.01); *G06Q 20/4037* (2013.01); *G06Q 20/407* (2013.01); *G06Q 40/03* (2023.01)

(58) Field of Classification Search
CPC .. G06Q 30/06; G06Q 40/025; G06Q 30/0601; G06Q 30/04; G06Q 30/0224;
(Continued)

(56) References Cited

U.S. PATENT DOCUMENTS 5,715,314 A * 2/1998 Payne .................. G06Q 10/087
705/26.35
5,732,400 A * 3/1998 Mandler ................ G06Q 20/02
705/26.44
(Continued)

FOREIGN PATENT DOCUMENTS

| CN | 110245926 | 9/2019 |
| CN | 110414970 | 11/2019 |

(Continued)

OTHER PUBLICATIONS patents.google.com/patent/KR20170103074A Screen capture of Korean Patent Application KR1020160025217A, filed Mar. 2, 2016. "In step 320 . . . " to show translation from Korean to English of the term "delivery target" (Year: 2022).*
(Continued)

*Primary Examiner* — Daniel S Felten
*Assistant Examiner* — Claire A Rutiser
(74) *Attorney, Agent, or Firm* — Knobbe, Martens, Olson & Bear, LLP

(57) ABSTRACT

Disclosed is a method of processing item sales information by an electronic apparatus including acquiring a purchase request including item information related to an item selected by a user and information related to a payment means, providing a purchase response including approval information corresponding to the purchase request before proceeding with payment through the payment means in response to the purchase request when the information related to the payment means satisfies a first condition, transmitting a release request for the item to a first server; and requesting payment for at least some of an amount corresponding to one or more purchase requests related to the payment means according to an arrival of settlement timing corresponding to the payment means.

15 Claims, 12 Drawing Sheets

(58) Field of Classification Search
CPC .. G06Q 20/403; G06Q 20/12; G06Q 30/0222; G06Q 20/24; G06Q 10/083; G06Q 20/405; G06Q 20/407; G06Q 20/4037
See application file for complete search history.

(56) References Cited

U.S. PATENT DOCUMENTS

| | | | | |
|---|---|---|---|---|
| 6,064,987 | A * | 5/2000 | Walker | G06Q 10/087 705/30 |
| 8,255,337 | B1 * | 8/2012 | Bennett | G06Q 10/0834 705/333 |
| 8,473,316 | B1 * | 6/2013 | Panzitta | G06Q 30/0234 705/26.81 |
| 8,527,405 | B1 * | 9/2013 | Das | G06Q 30/0215 705/39 |
| 8,799,127 | B1 * | 8/2014 | Blair | G06Q 40/03 705/38 |
| 9,443,268 | B1 * | 9/2016 | Kapczynski | G06Q 30/04 |
| 9,639,899 | B1 * | 5/2017 | Gersitz | H04W 4/02 |
| 11,593,752 | B2 * | 2/2023 | Wier | G06Q 10/0837 |
| 2002/0042755 | A1 * | 4/2002 | Kumar | G06Q 10/087 705/26.4 |
| 2003/0110123 | A1 | 6/2003 | Sugano et al. | |
| 2004/0249767 | A1 * | 12/2004 | Perrin | G06Q 20/382 705/64 |
| 2005/0146966 | A1 | 7/2005 | Kawamura | |
| 2006/0004658 | A1 * | 1/2006 | Chau | G06Q 20/20 705/40 |
| 2006/0149577 | A1 * | 7/2006 | Stashluk | G06Q 30/016 705/13 |
| 2006/0242028 | A1 * | 10/2006 | Walker | G06Q 30/06 705/26.4 |
| 2007/0055623 | A1 | 3/2007 | Ha | |
| 2008/0052189 | A1 * | 2/2008 | Walker | G06Q 20/04 705/26.1 |
| 2008/0077506 | A1 * | 3/2008 | Rampell | G06Q 20/40 705/26.1 |
| 2009/0240624 | A1 * | 9/2009 | James | G06Q 20/4016 705/44 |
| 2010/0114724 | A1 * | 5/2010 | Ghosh | G06Q 20/10 705/16 |
| 2013/0097073 | A1 * | 4/2013 | Keld | G06Q 20/14 705/40 |
| 2014/0129435 | A1 * | 5/2014 | Pardo | G06Q 20/36 705/41 |
| 2015/0066752 | A1 * | 3/2015 | Phillips | G06Q 20/22 705/40 |
| 2015/0066765 | A1 | 3/2015 | Banks et al. | |
| 2015/0127492 | A1 * | 5/2015 | Narayanaswami | G06Q 20/12 705/26.81 |
| 2017/0124511 | A1 * | 5/2017 | Mueller | H04W 4/029 |
| 2017/0154302 | A1 * | 6/2017 | Streebin | G06F 30/00 |
| 2018/0025417 | A1 * | 1/2018 | Brathwaite | G06Q 30/08 705/14.66 |
| 2018/0336506 | A1 * | 11/2018 | Malhotra | G06Q 20/3224 |
| 2019/0095862 | A1 * | 3/2019 | Kilzer | G05D 1/0088 |
| 2020/0160428 | A1 * | 5/2020 | Calvo | G06Q 30/0633 |
| 2021/0158254 | A1 * | 5/2021 | Feldman | G06Q 10/0637 |
| 2021/0256468 | A1 * | 8/2021 | Downing | G06Q 10/0835 |

FOREIGN PATENT DOCUMENTS

| | | |
|---|---|---|
| CN | 110969427 | 4/2020 |
| KR | 10-2002-0027769 A | 4/2002 |
| KR | 10-2005-0091203 A | 9/2005 |
| KR | 10-0583181 B1 | 5/2006 |
| KR | 10-0736856 B1 | 7/2007 |
| KR | 10-2013-0110808 A | 10/2013 |
| KR | 10-2015-0022754 A | 3/2015 |
| KR | 10-1547165 B1 | 8/2015 |
| KR | 10-2015-0130112 A | 11/2015 |
| KR | 10-1796520 B1 | 11/2017 |
| KR | 10-2020-0055925 A | 5/2020 |
| TW | 201915894 | 4/2019 |
| WO | WO 2011/022040 A1 | 2/2011 |
| WO | WO 15/183412 | 12/2015 |

OTHER PUBLICATIONS

Hu, X., Lin, Z., Whinston, A. B., & Zhang, H. (2004). Hope or hype: On the viability of escrow services as trusted third parties in online auction environments. Information Systems Research, 15(3), 236-249. (Year: 2004).*

Naver Blog, Woori Card, https://blog.naver.com/the_esc/ 220592354581, Jan. 9, 2016.

Huang et al., Jun. 2011, Tao the world at home, ISBN 978-7-5330-3443-6, p. 75.

Lin et al., Dec. 2017, C2C online shop operation and management, ISBN 978-7-5670-1622-4, pp. 173-174.

Xiao et al., Jun. 2017, Practical tutorial for the middle-aged and elderly to use computer and mobile phone to access the Internet, ISBN 978-7-5623-5254-9, pp. 146-147.

Lin et al., Dec. 2017, C2C Online shop operation and management, China Ocean University Press, ISBN 978-7-5670-1622-4, pp. 173-174.

* cited by examiner

07.15  Amount to be paid later  >      (Deferred payment?)
       (Deferred payment)
178,700 won Usage limit in June (300,000 won)

178,700won used                        121,300won left

Payment method            AA bank*********7878  >

ELECTRONIC APPARATUS FOR PROCESSING ITEM SALES INFORMATION AND METHOD THEREOF

BACKGROUND

Technical Field

The present disclosure relates to an electronic apparatus for processing item sales information and a method thereof. More specifically, the present disclosure relates to an electronic apparatus that responds to a purchase request for an item and provides a purchase response including approval information corresponding to the purchase request before proceeding with payment, transmits a release request for the item, and requests payment for at least some of the amount corresponding to the purchase request according to the arrival of settlement timing, and a method thereof.

Description of the Related Art

With the development of electronic technology, e-commerce has become a field of shopping. Customers may purchase items online without going to the shopping mall or market directly, and items purchased online are delivered to delivery destinations requested by customers.

In the case of the e-commerce, since customers often input their personal information when signing up for websites and it is easy to understand customers' purchase history of items on the web sites, it is easier to determine purchasing tendencies of customers or reliability of customers compared to offline commerce.

In the case of such e-commerce, items may be paid for through a financial institution such as a bank. However, the payment for items may be restricted due to reasons such as financial institutions being inspected at settlement timing of items or a customer's insufficient bank account balance. In this case, customers may not immediately purchase the desired products, which may cause inconvenience to customers. In particular, when customers are determined to be reliable in the light of customers' payment history (that is, when customers are determined to have a will and ability to pay for items later), the customers may be allowed to purchase items even before proceeding with paying for the items. As a result, there may be a need to provide convenience for commerce to customers and allow the customers to receive items without delay.

Financial institutions such as a bank should undergo periodic inspections to check the integrity of the system and the like and may also undergo inspections for maintenance, repair, replacement, upgrade, and the like of various computer networks. However, the payment for items for e-commerce may be restricted during the inspection time, and the payment for items is restricted and thus the preparation for delivery of the items may not be made. As a result, when the payment request for items is received during the inspection time corresponding to the payment means, the delivery of the items may be delayed.

In this regard, related art documents such as KR101547165B1 or KR100583181B1 may be referred.

SUMMARY

Technical Goals

An aspect provides an electronic apparatus for processing item sales information that provides a purchase response including approval information corresponding to a purchase request for an item before proceeding with payment through a payment means in response to the purchase request when information related to payment means satisfies a first condition, transmits a release request for the item, and requests payment for at least some of the amount corresponding to one or more purchase requests related to the payment means according of the arrival of settlement timing, and a method thereof.

The goals to be achieved by example embodiments of the present disclosure are not limited to the objectives described above and other objects may be inferred from the following example embodiments.

Technical Solutions

According to an aspect, there is provided a method of processing item sales information by an electronic apparatus including acquiring a purchase request including item information related to an item selected by a user and information related to a payment means, providing a purchase response including approval information corresponding to the purchase request before proceeding with payment through the payment means in response to the purchase request when the information related to the payment means satisfies a first condition, transmitting a release request for the item to a first server, and requesting payment for at least some of an amount corresponding to one or more purchase requests related to the payment means according to an arrival of settlement timing corresponding to the payment means.

The item information may include amount information, the information related to the payment means may include balance information related to a limit amount of the payment means, and the providing of the purchase response may include determining whether the first condition is satisfied based on the amount information and the balance information in response to the acquisition of the purchase request.

Whether the payment means is usable and the limit amount of the payment means may be determined whenever the purchase request is acquired.

Whether the payment means is usable and a limit amount of the payment means may be periodically determined according to the arrival of the settlement timing corresponding to the payment means.

Whether the payment means is usable and a limit amount of the payment means may be determined based on reliability set in relation to the user.

The reliability may be set based on at least one of a purchase history corresponding to the user, a membership level corresponding to the user, a subscription period corresponding to the user, a credit score corresponding to the user, and user information acquired from an affiliate.

The purchase history may include at least one of a list of one or more items purchased by the user, a payment means used by the user for payment for the one or more items, a product review written by the user, an overdue history of the user related to payment for the one or more items, information related to a delivery destination corresponding to the one or more items, and information related to a terminal used by the user for payment for the one or more items.

When the item belongs to a specific category, the limit amount may fluctuate.

The method of processing item sales information may further include providing a benefit related to a purchase of the item when the reliability is greater than a preset first value.

The method of processing item sales information may further include providing a rejection response to the purchase request when there is no limit amount of the payment means or when balance information related to the limit amount is less than an amount corresponding to the purchase request.

The method of processing item sales information may further include, when the information related to the payment means satisfies a second condition after the purchase response is provided, canceling an approval corresponding to the purchase request and providing information including the cancellation of the approval.

The requesting of the payment may include transmitting a payment request to a second server corresponding to a first payment method designated in response to the payment means.

The first payment method may correspond to a transfer based on account information managed by the second server, and the payment request may correspond to a request for the second server to transfer an amount requested for the payment based on the account and transmit payment information including a transfer history of the amount requested for the payment to the electronic apparatus.

The method of processing item sales information may further include transmitting a reimbursement request for an amount requested for the payment to the user when payment failure information is received from the second server in response to the payment request, in which the reimbursement request may include the payment failure information.

The method of processing item sales information may further include transmitting a payment request to a third server corresponding to a second payment method not designated in response to the payment means among payment methods registered in advance in the electronic apparatus in response to the user when payment failure information is received from the second server in response to the payment request.

The method of processing item sales information may further include: when payment failure information is received from the second server in response to the payment request, canceling an approval corresponding to the purchase request; and providing information including the cancellation of the approval.

The method of processing item sales information may further include requesting payment for an amount requested for a settlement when receiving a settlement request of the user for the at least some of the amount corresponding to the one or more purchase requests related to the payment means prior to the settlement timing.

A user interface (UI) for receiving a settlement request of the user may be deactivated within a preset period before and after the settlement timing.

According to an example embodiment, when receiving the settlement request of the user within a preset period before or after the settlement timing, the information that does not request the payment in response to the settlement request of the user and includes the request for the payment according to the arrival of the settlement timing may be provided.

According to an example embodiment, the providing of the purchase response may include determining whether the item is a delivery target, providing the purchase response to the item when the item is the delivery target, and providing rejection information corresponding to the purchase request for the item when the item is not the delivery target.

According to another aspect, there is provided an electronic apparatus for processing item sales information including a transceiver, a memory for storing instructions, and a processor, in which the processor is connected to the transceiver and the memory to acquire a purchase request including item information related to an item selected by a user and information related to a payment means, provide a purchase response including approval information corresponding to the purchase request before proceeding with payment through the payment means in response to the purchase request when the information related to the payment means satisfies a first condition, transmit a release request for the item to a first server, and request payment for at least some of an amount corresponding to one or more purchase requests related to the payment means according to an arrival of settlement timing corresponding to the payment means.

Detailed contents of other example embodiments are described in a detailed description and are illustrated in the accompanying drawings.

Effects

According to example embodiments, an electronic apparatus for processing item sales information and a method thereof provide a purchase response including approval information corresponding to the purchase request before proceeding with a payment through a payment means when selling items in an e-commerce market and transmit a release request for the items, thereby ensuring a prompt purchase and delivery of the items and providing convenience of item purchase to trusted users.

Effects of the present disclosure are not limited to the above-described effects, and other effects that are not described will be clearly understood by those skilled in the art from the description of the scope of the claims.

BRIEF DESCRIPTION OF THE DRAWINGS

FIG. 7 is a diagram for describing an example of a limit amount of the deferred payment service and balance information in the system for processing item sales information according to the example embodiment.

DETAILED DESCRIPTION

Figure 1:
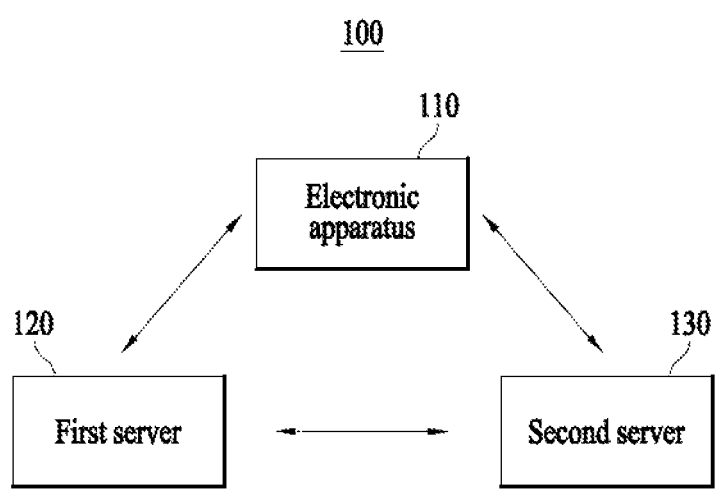
FIG. 1 is a schematic configuration diagram illustrating a system for processing item sales information according to an example embodiment.

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise designated, "including" any component means that other components may be further included rather than excluding other components. In addition, the terms "unit," "module," and the like described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook computer, a desktop computer, a laptop computer, and the like, which are equipped with a web browser, and portable terminals are wireless communication devices that ensure portability and mobility and may include, for example, all kinds of handheld-based wireless communication devices such as a communication-based terminal, a smartphone, and a tablet personal computer (PC) which support International Mobile Telecommunications (IMT), code division multiple access (CDMA), W-code division multiple access (W-CDMA), Long Term Evolution (LTE), etc.

Hereinafter, the example embodiments of the present disclosure will be described in detail with reference to the accompanying drawings so that those skilled in the art to which the present disclosure pertains may easily practice the present disclosure. However, the present disclosure may be implemented in various different forms and is not limited to the example embodiments described herein.

Hereinafter, example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from the following description of the example embodiments with reference to the accompanying drawings. However, the present disclosure is not limited to the example embodiments disclosed herein but may be implemented in various forms. The example embodiments make contents of the present disclosure thorough and are provided so that those skilled in the art can easily understand the scope of the present disclosure. Therefore, the present disclosure will be defined by the scope of the appended claims. Throughout the specification, like reference numerals denote like components.

In this case, it will be appreciated that each block of a processing flowchart and combinations of the flowcharts may be executed by computer program instructions. Since these computer program instructions may be installed in a processor of a general computer, a special purpose computer, or other programmable data processing apparatuses, these computer program instructions executed through the processor of the computer or the other programmable data processing apparatuses create a means for performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including an instruction means for performing the functions described in the block(s) of the flowchart. Since the computer program instructions may also be installed in the computer or the other programmable data processing apparatuses, the instructions perform a series of operation steps on the computer or the other programmable data processing apparatuses to create processes executed by the computer, thereby running the computer or the other programmable data processing apparatuses may also provide operations for performing the functions described in the block(s) of the flowchart.

In addition, each block may indicate some modules, segments, or codes including one or more executable instructions for executing a specific logical function(s). Further, it is to be noted that functions described in the blocks occur regardless of a sequence in some alternative example embodiments. For example, two blocks that are consecutively shown may in fact be simultaneously performed or performed in a reverse sequence depending on corresponding functions.

FIG. 1 is a schematic configuration diagram illustrating a system for processing item sales information according to an example embodiment.

According to example embodiments, a system 100 for providing item sales information may include an electronic apparatus 110, a first server 120, and a second server 130. According to an example embodiment, the system 100 for processing item sales information may further include, for example, a third server corresponding to a payment method different from that of the second server 130. According to the example embodiment, the system 100 for providing item sales information may further include a network that supports information transmission/reception between the electronic apparatus 110, the first server 120, the second server 130, and at least some of other external apparatuses.

Each of the electronic apparatus 110, the first server 120, the second server 130, and the third server may include a transceiver, a memory, and a processor. In addition, each of the electronic apparatus 110, the first server 120, the second server 130, and the third server refers to a unit that processes at least one function or operation, which may be implemented as hardware, software, or a combination of hardware and software. Meanwhile, in the overall example embodiment, the electronic apparatus 110, the first server 120, and the second server 130 are referred to as separate servers, which may be a logically divided structure, and may be implemented by functions separated from one server.

According to the example embodiment, the electronic apparatus 110, the first server 120, the second server 130, and the third server may include a plurality of computer systems or computer software implemented as network servers. For example, at least some of the electronic apparatus 110, the first server 120, the second server 130, and the third server may be referred to as the computer system and the computer software that are connected to a low level device capable of communicating with other network servers through a computer network such as the intranet or the Internet to accept a job execution request, perform an operation thereon, and provide an execution result. In addition, at least some of the electronic apparatus 110, the first server 120, the second server 130, and the third server may be understood as a broad concept including a series of application programs that may operate on a network server and various databases built therein. For example, at least some of the electronic apparatus 110, the first server 120, and the second server 130 may be implemented using network server programs that are variously provided according to operating systems such as DOS, Windows, Linux, UNIX, or macOS.

The electronic apparatus 110 may provide a variety of information organized as web pages. In detail, the electronic apparatus 110 may be an apparatus that serves to provide item sales information to a user. In order to provide information, the electronic apparatus 110 acquires a purchase request including item information related to an item selected by a user and information related to a payment means (hereinafter, referred to as a first payment means for convenience of description). The item is an item displayed by the electronic apparatus 110 and may be an item that a user (customer) may purchase online through the electronic apparatus 110. The purchase request for the item may be received from a user terminal 210 of FIG. 2.

When the information related to the first payment means satisfies a first condition, the electronic apparatus 110 provides the purchase response including approval information corresponding to the purchase request before proceeding with payment through the first payment means in response to the purchase request. The first payment means may correspond to a payment means using a deferred payment service, and the deferred payment service may correspond to a service that enables a user to purchase an item before paying for the item and to pay for the payment amount later. Meanwhile, the deferred payment service is described in the example embodiment, which may mean a service that a user pays the payment amount later.

For convenience of description, the following description will be given based on the example embodiment corresponding to the case in which the first payment means uses the deferred payment service. However, it is not considered that the payment according to the first payment means is necessarily limited to the example embodiment that uses the deferred payment service, and an example embodiment or the like in which a financial institution (bank, etc.) corresponding to the first payment means is inspected or a temporary payment error occurs may be further considered.

According to the example embodiment, the deferred payment service may be provided only when an item corresponding to a purchase request is a delivery target. In this case, the electronic apparatus 110 may determine whether the item corresponding to the purchase request is an item to be delivered and provide a purchase response to the item when the item is the delivery target. On the other hand, when the item is not the delivery target, the electronic apparatus 110 may provide rejection information corresponding to the purchase request for the item. In addition, in the example embodiment, the electronic apparatus 110 may limit payment using the deferred payment service even for items with high cashability by administrator setting.

The electronic apparatus 110 may determine whether a first condition is satisfied based on the amount information including the item information corresponding to the acquisition of the purchase request and the balance information related to the limit amount of the first payment means, which may be described below in more detail with reference to FIG. 2.

The electronic apparatus 110 transmits a release request for the items to the first server 120. The release request may correspond to a request to release at least some of the items from a fulfillment center and deliver the released items, and the first server 120 receiving the release request may perform a procedure for releasing and delivering the items. The first server 120 may instruct a fulfillment center corresponding to a user's delivery destination to release and deliver items.

With the arrival of settlement timing corresponding to the first payment means, the electronic apparatus 110 requests payment or disbursement for at least some of the amount corresponding to one or more purchase requests related to the first payment means. The electronic apparatus 110 may request payment by transmitting a payment request to the second server 130 corresponding to a first payment method designated in response to the first payment means. The payment request may correspond to a request to pay an amount requested for payment (hereinafter, a payment amount) in response to at least some of one or more purchase requests. Specifically, the payment request may correspond to a request for the second server 130 to transfer a payment amount based on account information corresponding to a user and transmit payment information including a transfer history of the payment amount to the electronic apparatus 110.

The payment request may include account information corresponding to the first payment mean, and when the account information corresponding to the first payment means is registered in advance, the account information registered in advance may be transmitted. In addition, in the example embodiment, a user may perform a plurality of payment means to use a deferred payment service and may sequentially request payment for a settlement amount for each of the payment means according to the user's setting or operation of the electronic apparatus 110.

According to the example embodiment, the account information related to the account corresponding to the first payment method managed by the second server 130 may be received along with the purchase request. Alternatively, the account information related to an account corresponding to the first payment method may be registered in advance in the electronic apparatus 110. When information related to an account is registered in advance in the electronic apparatus 110, the electronic apparatus 110 may perform payment using the previously input account information without having to receive the account information from the user again.

The second server 130 may be a server corresponding to the first payment method. Specifically, the first payment method may correspond to a payment amount transfer based on the account information managed by the second server 130. According to the example embodiment, the second server 130 may correspond to a server managed by a specific financial institution. For example, the second server 130 may correspond to a server managed by XX Bank. The second server 130 receiving the payment request from the electronic apparatus 110 may determine whether the account information included in the payment request is valid and determine whether a balance of the account corresponding to the account information is greater than or equal to the amount requested for payment. Depending on the determination result, the second server 130 may transfer the payment amount to the electronic apparatus 110 or transmit payment failure information to the electronic apparatus 110, which will be described below in more detail with reference to FIGS. 2 and 3.

The first server 120 may be a server that manages a fulfillment center for storage and delivery of items sold through the electronic apparatus 110 online. In addition, in the example embodiment, the first server 120 may be a server that integrates and manages a plurality of fulfillment centers and may be a system in which servers of each fulfillment center are connected through a network. Upon receiving the release request for at least some of the items, the first server 120 may release the items and deliver the released items to an input address. When a cancellation request for the release request is accepted for items that have not yet been delivered, the first server 120 may cancel the release.

The third server may be a server corresponding to a second payment method not designated in response to the first payment means among the payment methods registered in advance in the electronic apparatus 110 in response to the user. When the electronic apparatus 110 according to the example embodiment receives the payment failure information from the second server 130, the electronic apparatus 110 may transmit a payment request to a third server. The first payment method may be transmitted by including the information in the purchase request, while the second payment method may be limited to the payment method included in the payment method registered in advance in the electronic apparatus 110.

The transmission of the payment request to the third server by the electronic apparatus 110 will be described below in more detail with reference to in FIG. 3.

Operations related to the method of processing a series of item sales information according to various example embodiments may be implemented by a single physical device or may be implemented in a manner in which a plurality of physical devices are organically combined. For example, some of the components included in the system 100 for processing item sales information may be implemented by any one physical device, and the other components may be implemented by another physical device. For example, any one physical device may be implemented as a part of the electronic apparatus 110, and another physical device may be implemented as a part of the second server 130, a part of the first server 120, a part of the third server, or as a part of an external apparatus. In some cases, each of the components included in the system 100 for processing item sales information is distributed and arranged in different physical devices, and the distributed components may be organically combined to perform the functions and operations of the system 100 for processing item sales information. For example, the electronic apparatus 110 of the present specification may include at least one sub-device, and some operations described as being performed by the electronic apparatus 110 may be performed by the first sub-device, and some other operations may also be performed by the second sub-device.

Figure 2:
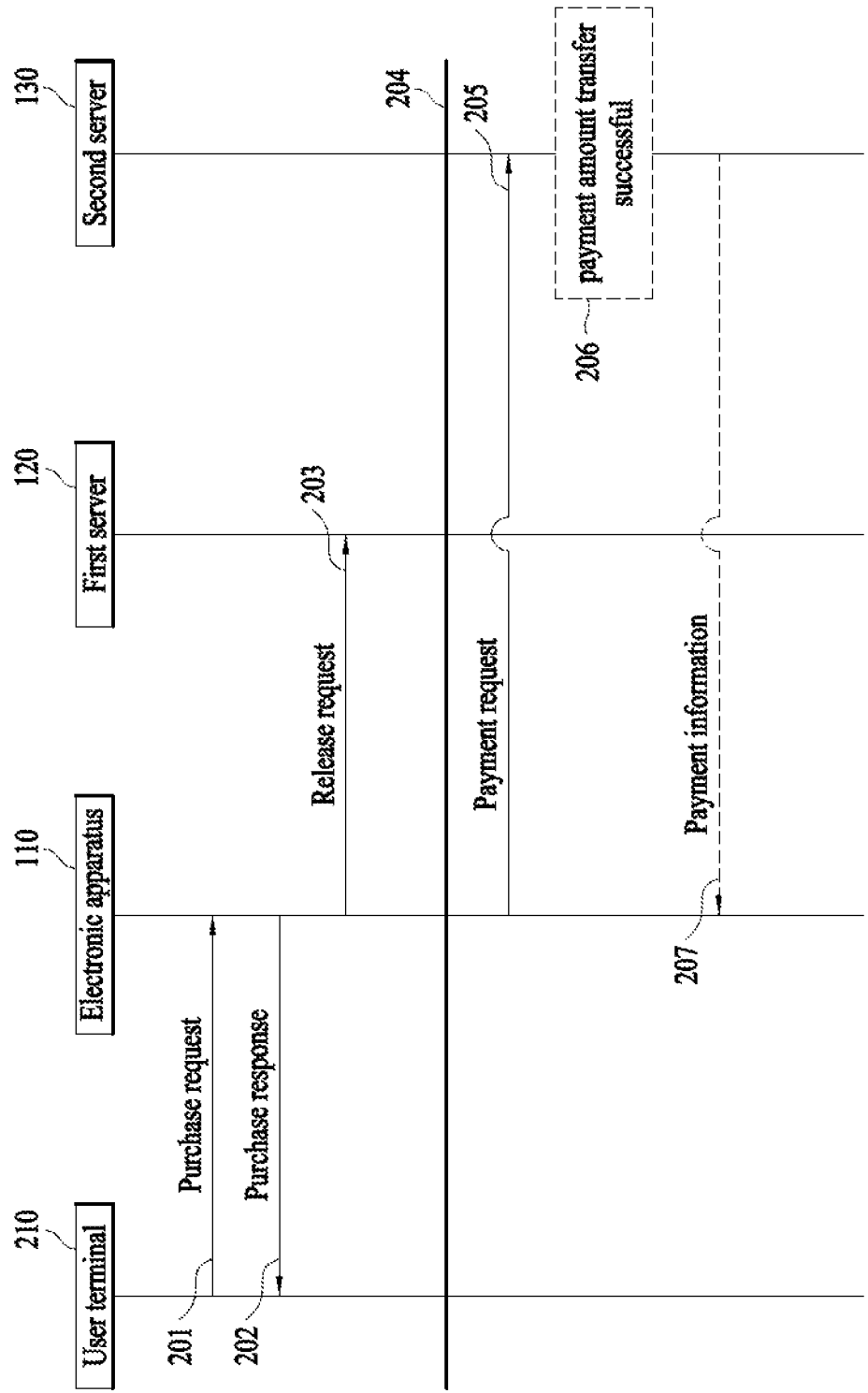
FIG. 2 is a flowchart of an operation of an information processing method in the system for processing item sales information according to the example embodiment.

FIG. 2 is a flowchart of an operation of an information processing method in the system for processing item sales information according to the example embodiment.

Referring to FIG. 2, the electronic apparatus 110 according to the example embodiment acquires a purchase request including item information and information related to the first payment means from a user terminal 210 (201). The user terminal 210 may include a computer device, a mobile communication terminal, or the like. When the information related to the first payment means satisfies a first condition, the electronic apparatus 110 provides a purchase response including approval information corresponding to the purchase request before proceeding with payment through the first payment means in response to the purchase request (202). As described above, the first payment means may correspond to the deferred payment service.

The item information included in the purchase request may include amount information, and the information related to the first payment means may include balance information related to the limit amount of the first payment means. The limit amount of the first payment means may correspond to a limit of an amount set so that an item may be paid for using the first payment means, and the balance information may correspond to an amount not yet used for item payment among the limits. For example, it can be understood that when the limit amount that may be paid for one month in July is 300,000 won and the balance information is 170,000 won, a customer can pay up to 300,000 won with the first payment means for one month in July, has purchased an item currently worth 130,000 won, and can further purchase 170,000 won worth of items for the rest of July.

The electronic apparatus 110 may determine whether the first condition is satisfied based on the amount information and the balance information related to the limit amount in response to the acquisition of the purchase request. Specifically, the electronic apparatus 110 may determine whether the balance of the limit amount is greater than or equal to the payment amount for purchasing the item and determine that the first condition is satisfied only when the balance of the limit amount is greater than or equal to the payment amount for purchasing the item. In this regard, when the balance information related to the limit amount is less than the amount corresponding to the purchase request of the item or there is no limit amount (that is, when the first payment means is not usable), the electronic apparatus 110 according to the example embodiment may provide the rejection response to the purchase request, and an example related thereto will be described below with reference to FIG. 6.

According to the example embodiment, when the information related to the first payment means satisfies a second condition after providing the purchase response, the electronic apparatus 110 may cancel the approval corresponding to the purchase request and provide the information including the cancellation of the approval to the user. According to an example, when the balance of the limit amount of the first payment means is less than a payment amount for purchasing an item, it may be determined that the second condition is satisfied.

When the information related to the first payment means satisfies the second condition, the electronic apparatus 110 may further transmit a cancellation request for the release request to the first server 120 when the time when the second condition is satisfied is after the electronic apparatus 110 transmits the release request to the first server.

Whether the first payment means is usable and the limit amount of the first payment means may be determined based on the reliability set in relation to a user corresponding to the purchase request. The reliability may be an indicator corresponding to whether the user may be trusted to pay the payment amount without arrears when providing the deferred payment service to the user. According to the example embodiment, the reliability may be set based on at least one of a purchase history corresponding to a user, a membership level corresponding to a user, a subscription period corresponding to a user, a credit score corresponding to a user, and user information acquired from an affiliate. In this regard, the credit score corresponding to the user may be determined based on at least one of information acquired from a credit rating agency and information acquired by the electronic apparatus 110 itself. In addition, the affiliate may include at least one of a telecommunication company, a payment gateway (PG), and a public institution, the user information acquired from the affiliate may include at least one of rate plan information, roaming information, and various types of billing information acquired from the telecommunication company, the user information acquired from the PG may include at least one of mobile phone payment information and various types of billing information, and the user information acquired from the public institution may include at least one of tax information and utility bill information.

Further, the reliability may be further set based on at least one of a user's service subscription date, payment means information registered by a user, an amount charged by a user for immediate payment service, and an amount accumulated in response to a user in relation to the immediate payment service provided by the electronic apparatus 110.

The user's purchase history may include at least one of a list of one or more items purchased by a user, a payment means used by a user for payment for one or more items, a product review written by a user, a user's overdue history related to the payment for one or more items, information related to a delivery destination corresponding to one or more items, and information related to the terminal used by the user for payment for one or more items. In this regard, the information related to the delivery destination may include at least one of a delivery destination address, the number of delivery destinations, a change history of a delivery destination, and whether the delivery destinations match corresponding destinations in the recent purchase history. In addition, the information related to the terminal may include at least one of IP information corresponding to the terminal, an operating system used by the terminal, and a model of the terminal.

In addition, the membership level may be related to a membership provided by the electronic apparatus 110 or may correspond to a membership corresponding to one or more payment methods.

The reliability may be evaluated based on the result of determining purchase histories, membership levels, subscription periods, credit scores of other users, user information acquired from other affiliates, and the like, and whether the corresponding users have paid the payment amount without going into arrears while using the deferred payment service corresponding to the first payment means. For example, as a result of analyzing statistics related to other users, when it is determined that the delinquency rate of the deferred payment service is lower when the items are purchased more, the membership level is high, the subscription period is long, and the credit score is high, then the reliability of the user corresponding to the purchase request may be determined to be higher when the items are purchased more, the membership level is high, the subscription period is long, and the credit score is high.

According to the example embodiment, different weights may be assigned in consideration of individual factors for determining the reliability. For example, when the correlation between the credit score and the delinquency rate of the deferred payment service is very clear compared to the correlation between other factors and the delinquency rate of the deferred payment service (that is, the case in which the higher the credit score, the more clearly the degree to which the delinquency rate of the deferred payment service decreases), a high weight may be assigned to the credit score in consideration of individual factors.

In some example embodiments, the limit amount of the first payment means may be determined in a stepwise manner. For example, the electronic apparatus 110 may primarily determine whether the user can sign up for the first payment means and the limit of the first payment means and may secondarily determine the limit of the first payment means when there is a request to subscribe to the deferred payment service from the user. As an example, the electronic apparatus 110 may primarily determine whether the user can sign up for the first payment means and the limit of the first payment means based on the information acquired by the electronic apparatus 110 itself, such as the purchase history corresponding to the user, the membership level corresponding to the user, and the subscription period corresponding to the user. Thereafter, the electronic apparatus 110 may secondarily determine the limit of the first payment means based on the information acquired from at least one of a credit rating agency and an affiliated company. In this case, the electronic apparatus 110 may determine whether to expose the information related to the deferred payment service to the user based on whether or not to subscribe to the determined first payment means.

According to the example embodiment, whether the first payment means is usable and the limit amount of the first payment means may be periodically determined according to the arrival of the settlement timing corresponding to the first payment means. For example, as in the above example, the limit amount may correspond to the total amount that can be settled for a month, such as "a month in July", and as the month passes (for example, as August arrives), the limit can be newly determined. Also, in the settlement timing, the limit amount may be changed based on whether or not the payment for the amount used by the user has been made.

According to the example embodiment, whether the first payment means is usable and the limit amount of the first payment means may be determined whenever there is a purchase request. In this case, the reliability of the user may be determined whenever there is the purchase request from the user. In this case, even when the events such as the overdue history of the user or the sudden drop in the credit score of the user that may affect the reliability of the user occur suddenly, whether the first payment means is usable and the limit amount of the first payment means may be determined in consideration of all of the events.

According to the example embodiment, when an item corresponding to a purchase request belongs to a specific category, the limit amount may fluctuate. For example, when the item corresponding to the purchase request is an item with a high delinquency rate (for example, an expensive luxury item) according to the deferred payment service or an item with high cashability (for example, a gold bar), the limit amount may be set lower to prevent the situation in which the item payment amount is overdue and to block the demand to earn profits by reselling the item in advance. Further, in some cases, when an item corresponding to a purchase request belongs to a specific category, there may be no limit amount. In this case, a user may not use the first payment means. In addition, in an embodiment, a subject related to an operator of a service related to the electronic apparatus 110 may directly manage purchases and preferentially apply a deferred payment service to products to be delivered. By applying the deferred payment service only to such products, even when the user does not pay the amount paid, the related payment procedure may be executed simply.

According to the example embodiment, when the reliability is greater than the first preset value, the electronic apparatus 110 may further provide a benefit related to a purchase of an item. For example, the electronic apparatus 110 may provide additional price discount benefits in relation to the purchase of the item. As a result, the electronic apparatus 110 may guide a user to purchase an item sold through the electronic apparatus 110 online. In addition, the electronic apparatus 110 may guide a user to frequently use a deferred payment service and to pay a payment amount corresponding to an item purchased by using the deferred payment service without arrears.

When the information related to the payment means satisfies the first condition, the electronic apparatus 110 providing a purchase response transmits a release request for an item to the first server (203). In order for the electronic apparatus 110 to transmit the release request, there is no need to provide the purchase response. For example, when the information related to the payment means satisfies the first condition, the electronic apparatus 110 may provide the release request to the first server 120 simultaneously while providing the purchase response to the user terminal 210. Alternatively, according to the example embodiment, the electronic apparatus 110 may first provide the release request to the first server 120 and may provide the purchase response to the user terminal 210.

Upon receiving the release request, the first server 120 may prepare for the release and delivery of the item.

With the arrival of the settlement timing corresponding to the first payment means (204), the electronic apparatus 110 requests the payment for at least some of the amount corresponding to one or more purchase requests related to the first payment means. The electronic apparatus 110 may request payment by transmitting a payment request to the second server 130 corresponding to a first payment method designated in response to the first payment means (205). The payment request may correspond to a request to pay a payment amount corresponding to at least some of one or more purchase requests. Specifically, the payment request may correspond to a request for the second server 130 to transfer a payment amount based on an account and transmit payment information including a transfer history of the payment amount to the electronic apparatus 110.

When the payment amount is successfully transferred in the second server 130 (206), the second server 130 may transmit the payment information including the transfer history of the payment amount to the electronic apparatus 110 (207). The electronic apparatus 110 may confirm that the payment amount has been successfully transferred when receiving the payment information.

In some example embodiments, the electronic apparatus 110 may continuously monitor whether or not the payment amount is transferred without separately requesting the payment information.

In the example embodiment, the transfer may include at least one of a transaction generated by requesting payment of a specific amount from the electronic apparatus 110 to the second server 130 and a transaction in which the required amount is paid by triggering the second server 130.

Figure 3:
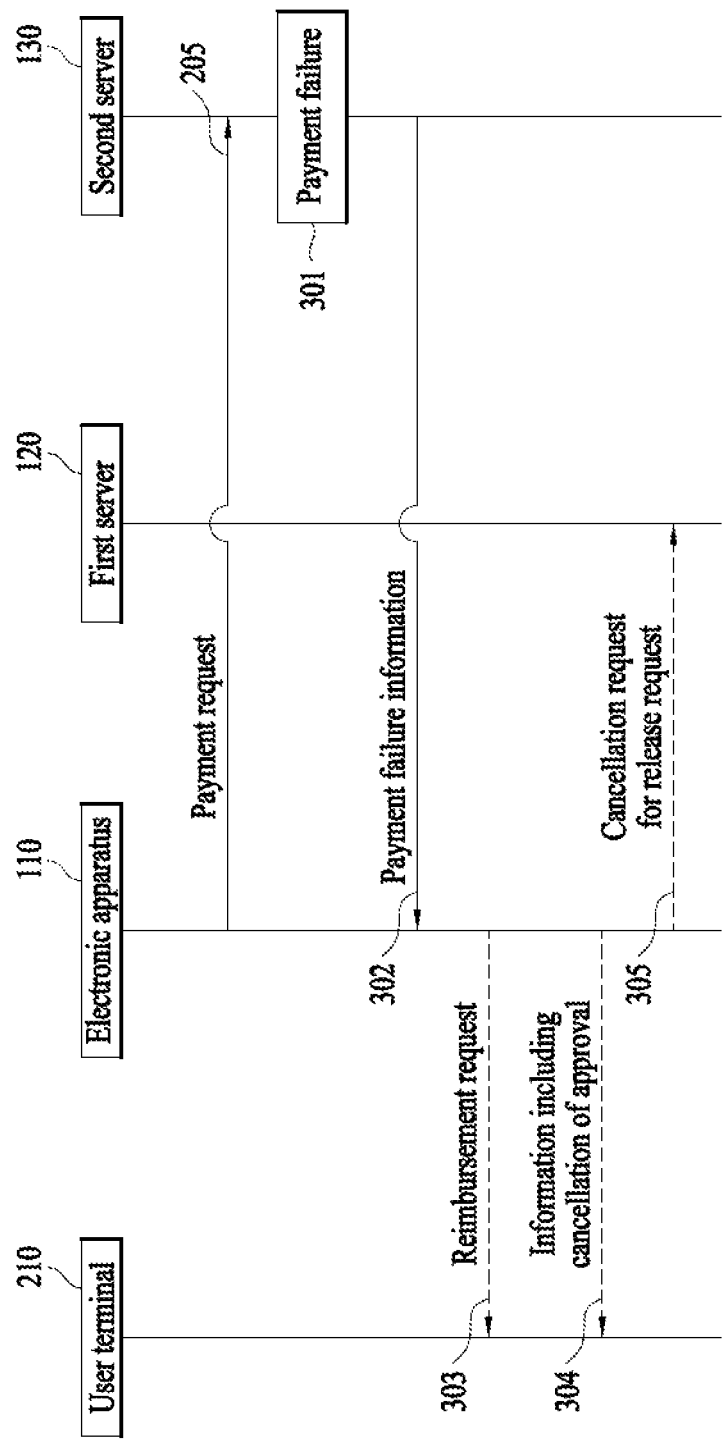
FIG. 3 is a flowchart of an operation performed when an electronic apparatus receives payment failure information from a second server in the system for processing item sales information according to the example embodiment.

FIG. 3 is a flowchart of an operation when the electronic apparatus receives payment failure information from the second server in the system for processing item sales information according to the example embodiment.

Referring to FIG. 3, the electronic apparatus 110 according to the example embodiment may transmit the payment request to the second server 130 corresponding to the first payment method designated in response to the first payment means (205) to request payment for at least some of an amount corresponding to one or more purchase requests related to the first payment means. When the payment for the payment amount fails in the second server 130 (301), the second server 130 may transmit the payment failure information to the electronic apparatus 110 (302).

According to the example embodiment, upon receiving the payment failure information, the electronic apparatus 110 may transmit a reimbursement request for a payment amount to a user (303). The electronic apparatus 110 may urge a user to pay for the overdue payment amount by transmitting the reimbursement request for the payment amount. In this case, the reimbursement request may include the payment failure information. Furthermore, the reimbursement request may further include information related to the restriction on the use of a late fee and a deferred payment service caused by arrears.

An example related to the reimbursement request transmitted by the electronic apparatus 110 will be described below with reference to FIG. 9.

According to the example embodiment, upon receiving the payment failure information, the electronic apparatus 110 may transmit the payment request to the third sever corresponding to the second payment method that is not designated in response to the first payment means among the payment methods registered in advance in the electronic apparatus 110 in response to the user. For example, when receiving the payment failure information in response to the payment request transmitted to the AA bank, the electronic apparatus 110 may transmit the payment request to the server for BB bank, which is the payment method registered in advance in response to the user. According to the example embodiment, when there are the plurality of payment methods registered in advance in the electronic apparatus 110 in addition to the first payment method, the electronic apparatus 110 may transmit the payment request to at least one of the plurality of servers corresponding to the plurality of payment methods. For example, the electronic apparatus 110 may transmit a payment request to at least one of a server for BB bank, a server for CC bank, and a server for DD bank, which are payment methods registered in advance in response to a user. Meanwhile, when the payment failure occurs, the electronic apparatus 110 may perform a procedure of canceling an order when there is an ongoing order for the corresponding user.

According to the example embodiment, the electronic apparatus 110 receiving the payment failure information may cancel the approval corresponding to the purchase request and transmit information including the cancellation of the approval to at least one of the user terminal 210 and the first server 120 (304). In this case, the electronic apparatus 110 may transmit a cancellation request for the release request to the first server 120 (305). When receiving information notifying the user that delivery of an item corresponding to a purchase request is already in progress or has been completed from the first server 120, the electronic apparatus 110 may further transmit information requesting the return of the item to the user terminal 210 or request the return of the item from a separate server.

Figure 4:
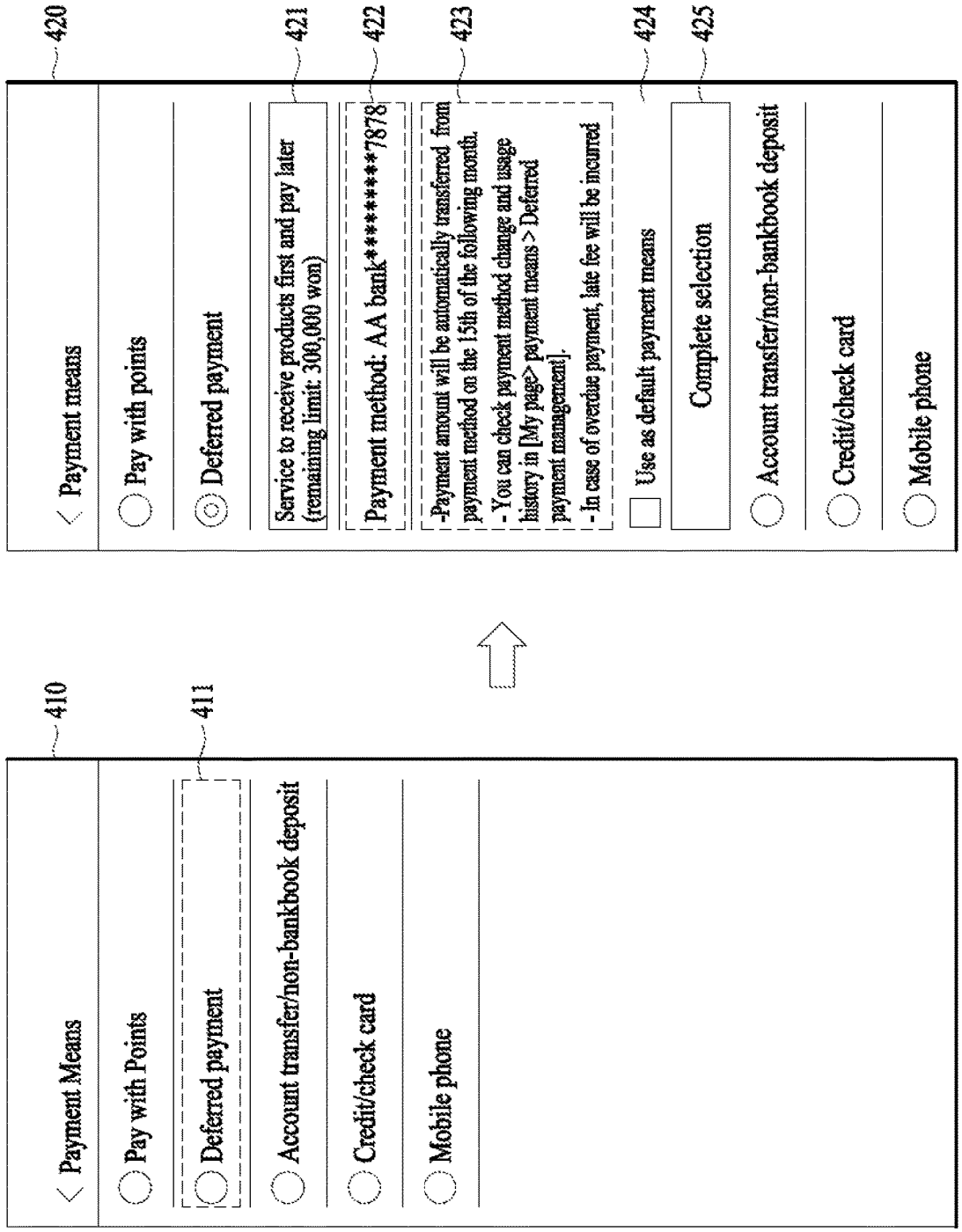
FIG. 4 is a diagram for describing an example of a user interface (UI) provided by an electronic apparatus for use of a deferred payment service in the system for processing item sales information according to the example embodiment.

FIG. 4 is a diagram for describing an example of a user interface (UI) provided by an electronic apparatus for use of a deferred payment service in the system for processing item sales information according to the example embodiment.

Referring to FIG. 4, the electronic apparatus 110 according to the example embodiment may provide a UI for providing the deferred payment service, which is the payment service according to the first payment means, to a user. The deferred payment service is displayed so that the user may select one of the plurality of payment means (411), and the plurality of payment means may include at least one of points payment, account transfer/non-bankbook deposit, credit/check card, and mobile phone payment (410).

When a selection input through the UI corresponding to the deferred payment service is acquired from the user, additional information related to the deferred payment service may be further displayed (420). Additional information according to the example embodiment may include at least some of a brief description of the deferred payment service and a limit amount 421 of the first payment means, information 422 related to the first payment method designated in response to the first payment means, and information 423 related to settlement timing, a change in the first payment method, a usage history of the deferred payment service, and an late fee. In addition, when the selection input through the UI corresponding to the deferred payment service is acquired from the user, an additional UI related to the deferred payment service may be further displayed, and the additional UI may include at least some of a UI 424 that may select whether to use the first payment means as a default payment means (that is, when there is no separate input to select the payment means when paying for the item next time, whether to perform payment through the first payment means), and a UI 425 for obtaining a selection input again after providing additional information related to a deferred payment service to a user.

As described above, whether the first payment means is usable and the limit amount of the first payment means may be determined based on the reliability set in relation to the user corresponding to the purchase request, and the information corresponding to the reference numeral 421 may display the limit amount determined based on the reliability set in relation to the user.

Figure 5:
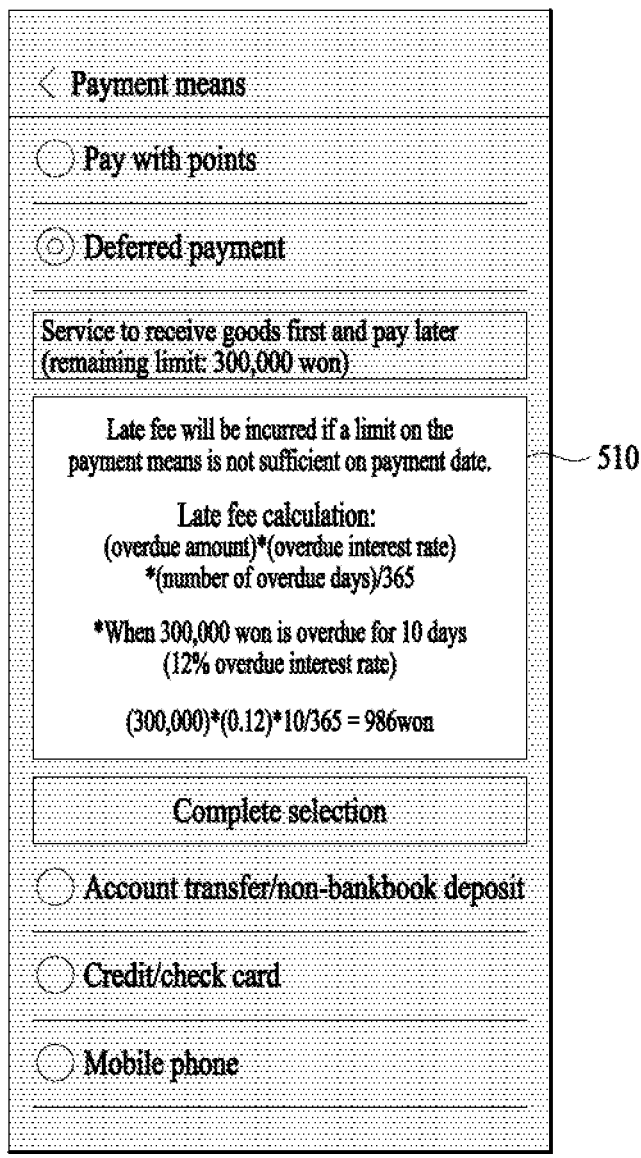
FIG. 5 is a diagram for describing an example of late fee information related to a deferred payment service in a system for processing item sales information according to the example embodiment.

FIG. 5 is a diagram for describing an example of late fee information related to a deferred payment service in a system for processing item sales information according to the example embodiment.

Referring to FIG. 5, in a system 100 for processing item sales information according to the example embodiment, the electronic apparatus 110 may provide a detailed description 510 related to a late fee to a user. According to the example embodiment, the detailed description 510 related to the late fee may be provided after the user's selection input through the UI 425 for acquiring the selection input is selected again after the additional information related to the deferred payment service is provided to the user. However, the detailed description 510 related to the late fee may be provided in various forms that may notify the user of this, and it may not be assumed in a manner that the detailed description 510 is provided only after the user's selection input through the UI corresponding to the reference numeral 425 is acquired.

The detailed description 510 related to the late fee according to the example embodiment may include the information notifying the user that the late fee occurs when the balance related to the limit amount of the first payment means at the settlement timing is not sufficient to pay for all items purchased through the deferred payment service. As an example, the information may correspond to a phrase such as "when a limit on the payment means is not sufficient on the payment date, the late fee will be incurred."

A calculation formula for calculating the late fee according to the example embodiment may be the same as (overdue amount)*(overdue interest rate)*(number of overdue days)/365. According to an example, when 300,000 won is overdue for 10 days and the overdue interest rate is 12% per year, the late fee may be calculated as (300,000)*(0.12)*10/365=986 won. In this regard, the detailed description 510 related to the late fee may include the calculation formula for calculating the late fee and the information related to an example of calculating the late fee.

Figure 6:
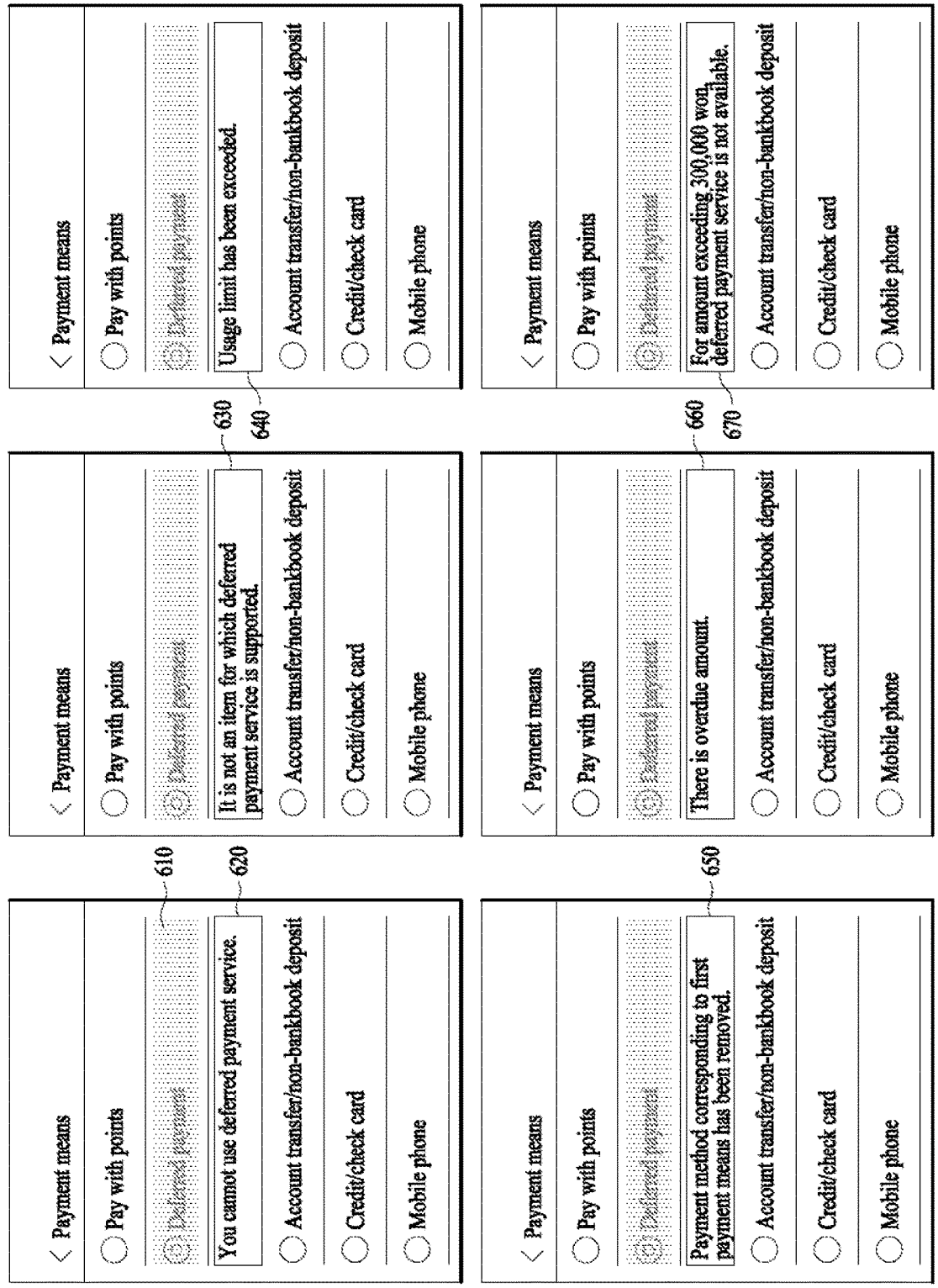
FIG. 6 is a diagram for describing an example of a case in which the use of the deferred payment service is restricted in connection with a purchase of an item in the system for processing item sales information according to the example embodiment.

FIG. 6 is a diagram for describing an example of a case in which the use of the deferred payment service is restricted in connection with a purchase of an item in the system for processing item sales information according to the example embodiment.

Referring to FIG. 6, when the deferred payment service according to the example embodiment is not usable, a UI for providing a deferred payment service may be deactivated (610). When the UI for providing the deferred payment service is deactivated, the electronic apparatus 110 may shade in the corresponding UI and change a font size or colors of letters in order to allow a user to easily recognize that the UI has been deactivated.

When the deferred payment service is not usable, the electronic apparatus 110 may provide a rejection response to the user's purchase request by providing the information notifying the user that the deferred payment service is not usable. According to the example embodiment, the information notifying the user that the deferred payment service is not usable may include the same contents regardless of the reason why the deferred payment service is not usable. For example, the information notifying the user that the deferred payment service is not usable may include a phrase such as "the deferred payment service is not usable" (620).

According to the example embodiment, the information notifying the user that the deferred payment service is not usable may include different contents according to the reason why the deferred payment service is not usable. As an example, when the item corresponding to the user's purchase request is not an item supported by the deferred payment service (e.g., a high-priced luxury item, an item with high cashability, a digital product that is not a delivery target, etc.), the information notifying the user that the deferred payment service is not usable may include a phrase such as "the item is not supported by the deferred payment service" (630). As another example, when all of the limit amount of the first payment means is used and thus there is no balance, the information notifying the user that the deferred payment service is not usable may include a phrase such as "the usage limit has been exceeded" (640). As another example, when the information related to the first payment method corresponding to the first payment means has been deleted, the information notifying the user that the deferred payment services is not usable may include a phrase such as "The payment method corresponding to the first payment means has been deleted." (650). As another example, when the overdue history exists in relation to the user's previous use of the deferred payment service and repayment has not yet been made, the information notifying the user that the deferred payment service is not usable may include a phrase such as "overdue amount exists." (660). As another example, when the amount of the item corresponding to the user's purchase request exceeds the limit amount of the first payment means, the information notifying the user that the deferred payment service is not usable may include a phrase such as "The deferred payment service is not available for an amount exceeding 300,000 won" (670).

The user receiving the rejection response may confirm that the use of the deferred payment service corresponding to the first payment means is restricted. Furthermore, when the information notifying the user that the deferred payment service is not usable according to the reason why the deferred payment service is not usable includes different content, the user may understand what actions should be taken in order to use the deferred payment service.

Referring to FIG. 7, the system for processing item sales information according to the example embodiment may provide the user with information on the limit amount of the deferred payment service and the balance information related to the limit amount (710). According to the example embodiment, the electronic apparatus 110 may display all of the limit amount, the amount using the deferred payment service, and the balance information in order to allow the user to easily check the limit amount and the balance information. For example, the electronic apparatus 110 may display a phrase such as "Usage limit in June (300,000 won)" corresponding to the limit amount, and use of 178, 700 won corresponding to the amount using the deferred payment service" and display a phrase such as "121,300 won left" corresponding to the balance information. Furthermore, in order to be able to easily identify a ratio of the amount using the deferred payment service to the limit amount and a ratio of the balance information to the limit amount, the electronic apparatus 110 may display a ratio of the amount using the deferred payment service and the balance information in the limit amount as a graph line having a length proportional to the size of the amount (refer to the drawing) or may further display the ratio of the amount using the deferred payment service and the balance information as a numerical value so that the ratio of the amount using the deferred payment service and the balance information may be revealed.

Figure 8:
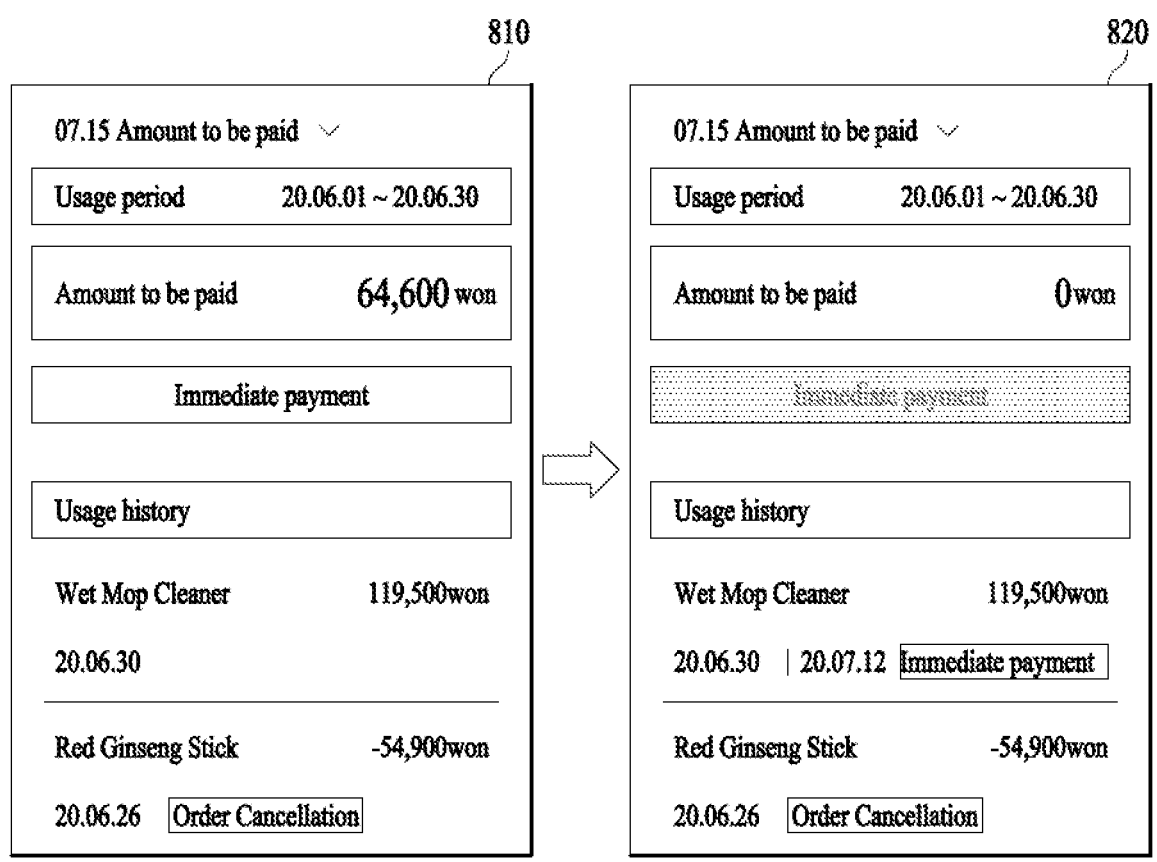
FIG. 8 is a diagram for describing an example of information related to a UI for a usage history of a deferred payment service and a user's settlement request provided by the electronic apparatus in the system for processing item sales information according to the example embodiment.

FIG. 8 is a diagram for describing an example of information related to a UI for a usage history of a deferred payment service and a user's settlement request provided by the electronic apparatus in the system for processing item sales information according to the example embodiment.

Referring to FIG. 8, the electronic apparatus 110 according to the example embodiment may provide a UI for receiving a user's settlement request so that payment may proceed according to the user's request even before the settlement timing (810). The page including the UI for receiving the user's settlement request may include at least one of settlement timing, an amount to be requested for payment at the settlement timing, and an item purchase history through a deferred payment service. When receiving the settlement request from the user for at least some of the amount corresponding to one or more purchase requests related to the first payment means before the settlement timing, the electronic apparatus 110 may request payment for the amount requested for settlement. In this regard, the UI for receiving the settlement request from the user may correspond to a UI including a phrase such as "immediate payment", and payment through the first payment method may be made according to the user's selection input.

When the user has not purchased the item through the deferred payment service or when the item purchase history has already been paid, the amount to be requested for payment at the settlement timing may exist. In this case, the UI for receiving the user's settlement request may be deactivated (820).

According to the example embodiment, the UI for receiving the settlement request from the user may be deactivated within a preset period before and after the settlement timing. As the UI for receiving the user's settlement request is deactivated, it is possible to prevent a situation in which the payment request is unexpectedly duplicated, and thus, the amount used for the deferred payment service is paid in duplicate. In this case, when receiving the settlement request of the user within a preset period before or after the settlement timing, the electronic apparatus 110 may provide the user with the information including requesting the payment according to the arrival of the settlement timing without requesting the payment in response to the user's settlement request.

In some example embodiments, the UI for receiving the user's settlement request for the preset period before the settlement timing may be deactivated, or the UI for receiving the user's settlement request for the preset period after the settlement timing may be deactivated.

Figure 9:
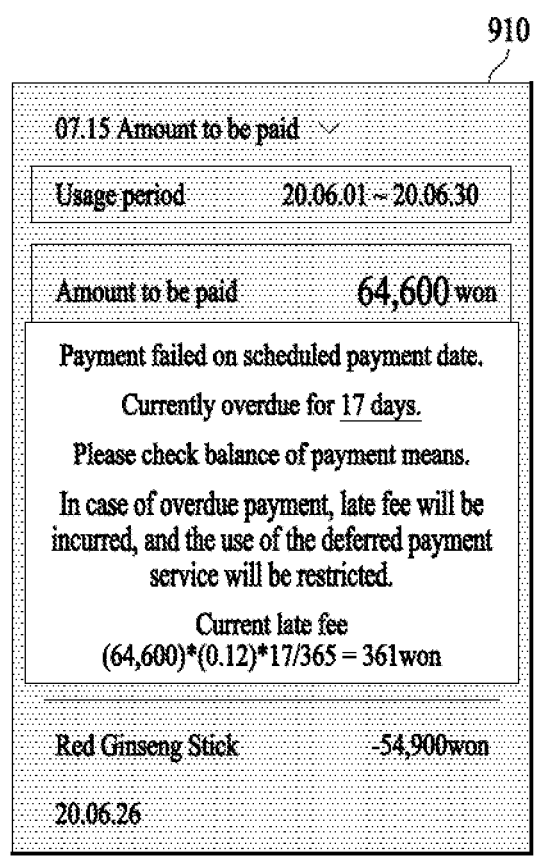
FIG. 9 is a diagram for describing an example of a case where arrears are incurred in relation to the deferred payment service in the system for processing item sales information according to the example embodiment.

FIG. 9 is a diagram for describing an example of a case where the arrears are incurred in relation to the deferred payment service in the system for processing item sales information according to the example embodiment.

Referring to FIG. 9, when the electronic apparatus 110 according to the example embodiment receives the payment failure information from the second server 130 in response to the payment request, the electronic apparatus 110 may transmit the reimbursement request for the amount requested for payment to the user. In this case, the reimbursement request transmitted by the electronic apparatus 110 may include late fee status information 910 along with the payment failure information. In this case, unlike the detailed description 510 related to the late fee of FIG. 5, the late fee status information 910 is information that actually announces the occurrence history of arrears, and therefore, may include at least one of the calculation formula for the late fee, the period for which the arrears are incurred, and the calculation result of the actual late fee. For example, the late fee status information 910 may include a phrase such as "Currently overdue for 17 days" and a phrase such as "current late fee: (64,600)*(0.12)*17/365=361 won." Furthermore, in order to urge the user to reimburse the fee, the late fee status information 910 may further include a phrase such as "In case of overdue payment, late fee will be incurred, and the use of the deferred payment service will be restricted." Meanwhile, when the payment failure occurs, the electronic apparatus 110 may block all payments of the corresponding user until the payment of the amount, in which the payment failure has occurred, is confirmed.

Figure 10:
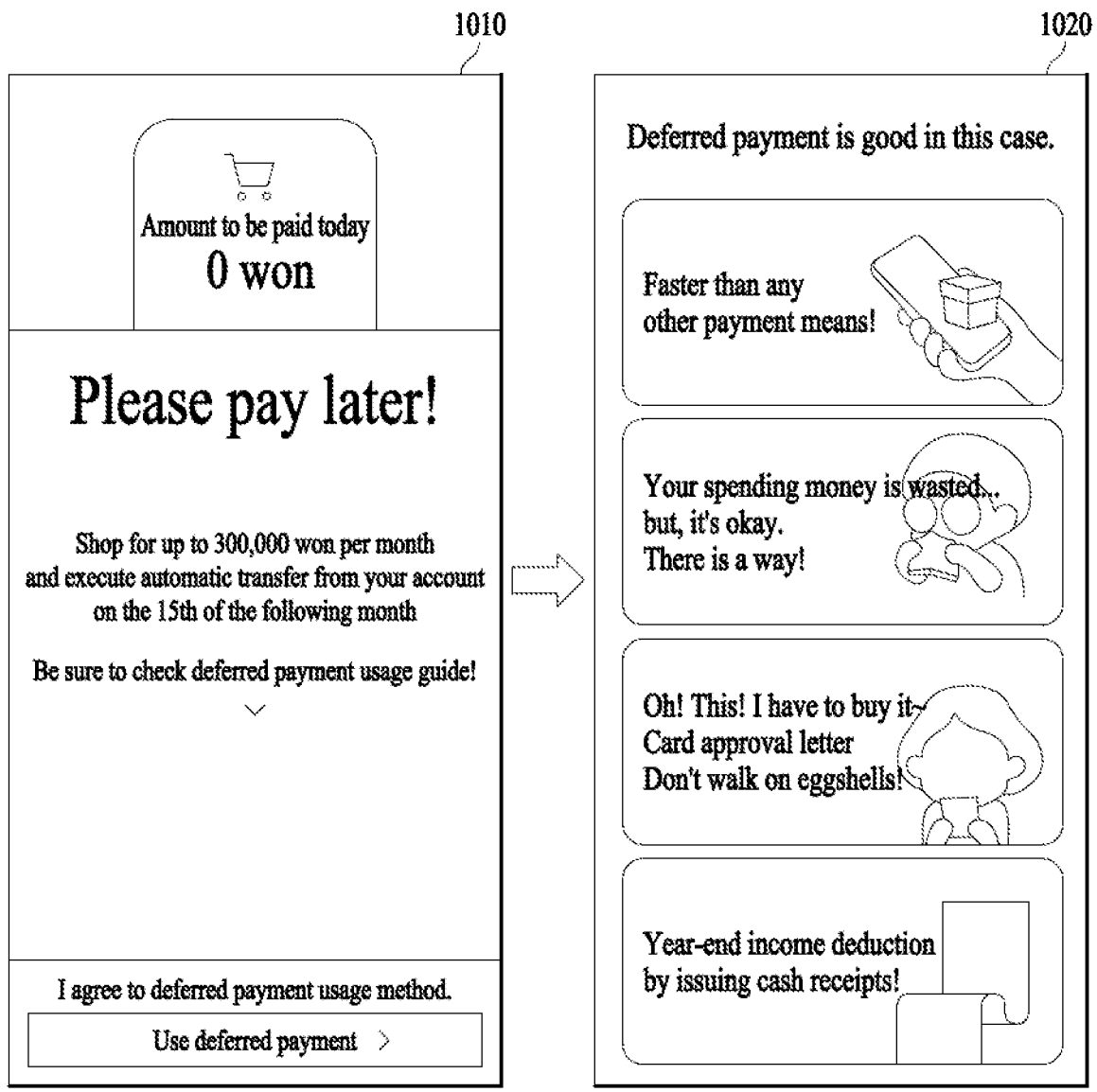
FIG. 10 is a diagram for describing an example of a case where the electronic apparatus provides information for announcing the deferred payment service in the system for processing item sales information according to the example embodiment.

FIG. 10 is a diagram for describing an example of a case where the electronic apparatus provides information for announcing the deferred payment service in the system for processing item sales information according to the example embodiment.

Referring to FIG. 10, the electronic apparatus 110 may provide information for announcing a deferred payment service to a user (1000). The information for announcing the deferred payment service may be provided on at least one of a main screen of a website, a product search result page, a product detail information page, a shopping cart page, and a payment request page. According to the example embodiment, the information for announcing the deferred payment service may include a brief phrase describing the deferred payment service (1010). For example, the information for announcing the deferred payment service may include a phrase such as "Please pay later! Shop for up to 300,000 won per month and execute automatic transfer from your account on the 15th of the following month." In this case, the limit amount related to the deferred payment service is set differently for each user, and a phrase may be displayed based on the set result.

According to the example embodiment, the information for announcing the deferred payment service may further include the UI for acquiring the user's selection input related to the usage guide (1010). By acquiring the user's selection input, additional information including various phrases for inducing the use of the deferred payment service may be provided (1020). For example, by acquiring the user's selection input, the electronic apparatus 110 may provide additional information including phrases such as "Faster than any other payment means", "Your spending money is wasted, but there is a way!", "You should buy without walking on eggshells about your card approval letter", and "Year-end income deduction by issuing cash receipts".

Figure 11:
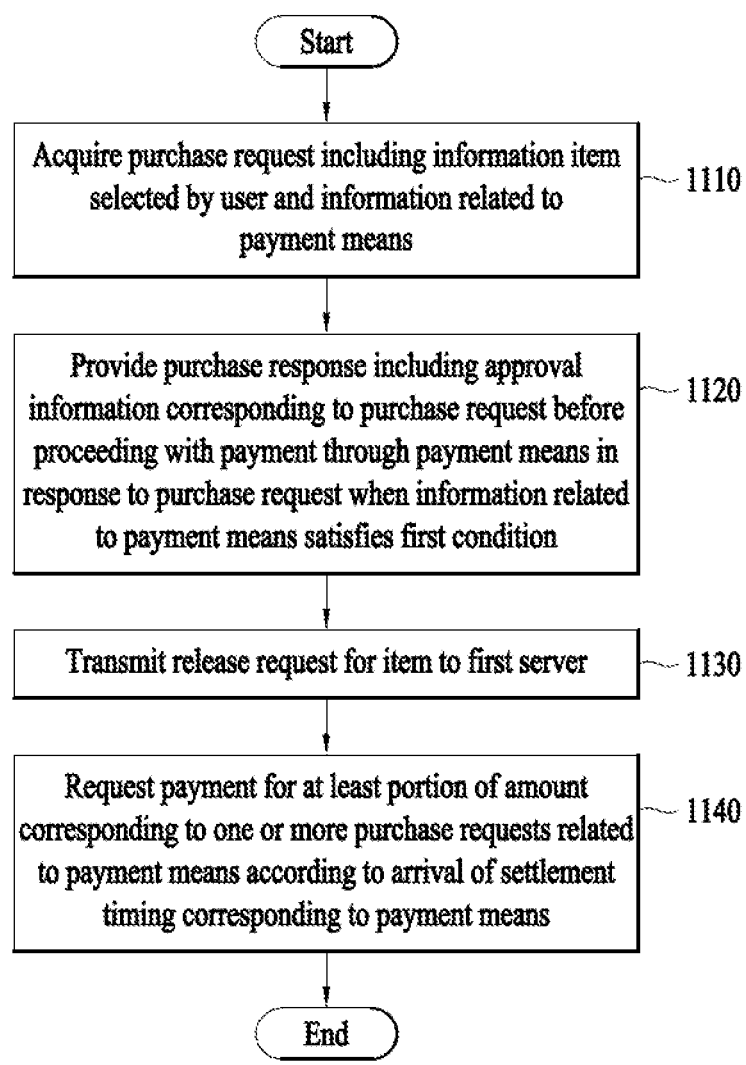
FIG. 11 is a flowchart of an operation of a method of processing item sales information by an electronic apparatus according to an example embodiment.

FIG. 11 is a flowchart of an operation of a method of processing item sales information by an electronic apparatus according to an example embodiment.

Referring to FIG. 11, in operation 1110, the electronic apparatus 110 according to the example embodiment acquires a purchase request including item information related to an item selected by a user and information related to the first payment means.

When the information related to the first payment means satisfies the first condition, in operation 1120, the electronic apparatus 110 provides a purchase response including approval information corresponding to a purchase request before proceeding with payment through the first payment means in response to the purchase request. In addition, the electronic apparatus 110 transmits a release request for an item to the first server 120 in operation 1130.

With the arrival of the settlement timing corresponding to the first payment means, in operation 1140, the electronic apparatus 110 requests payment for at least some of the amount corresponding to one or more purchase requests related to the first payment means.

Figure 12:
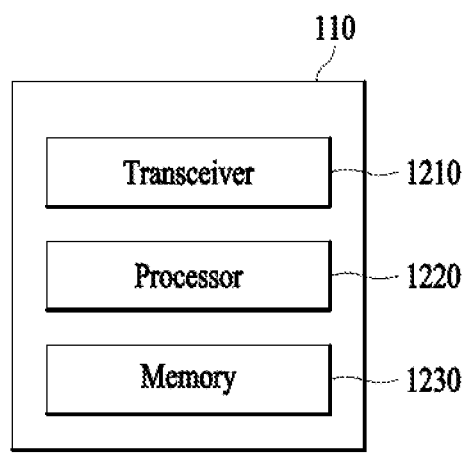
FIG. 12 is an exemplary diagram of a configuration of an electronic apparatus for processing item sales information according to an example embodiment.

FIG. 12 is an exemplary diagram of a configuration of an electronic apparatus for processing item sales information according to an example embodiment.

Referring to FIG. 12, an electronic apparatus 110 includes a transceiver 1210, a processor 1220, and a memory 1230. The electronic apparatus 110 is connected to the user terminal 210, the first server 120, the second server 130, the third server, other external apparatuses, and the like through the transceiver 1210 and may exchange data therebetween.

The processor 1220 may include at least one device described above with reference to FIGS. 1 to 11 or may perform at least one method described above with reference to FIGS. 1 to 11. The memory 1230 may store information (including at least some of the item information, the information related to the first payment means, the approval information, and the information related to the late fee) for performing at least one method described above with reference to FIGS. 1 to 11. The memory 1230 may be a volatile memory or a nonvolatile memory.

The processor 1220 may control the electronic apparatus 110 to execute a program and provide information. A code of the program executed by the processor 1220 may be stored in the memory 1230.

In addition, the electronic apparatus 110 according to the example embodiment may further include an interface capable of providing information to a user.

The example embodiments of the present disclosure are disclosed in the present specification and drawings, and although specific terms are used, it is merely used in a general sense to easily describe the technical content of the present disclosure and to aid understanding of the present disclosure but is not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic apparatus or terminal according to the above-described example embodiments may include a processor, a memory that stores and executes program data, a permanent storage such as a disk drive, a communication port for communication with an external apparatus, a touch panel, a key, a user interface device such as a button, and the like. Methods implemented as software modules or algorithms may be stored on a computer-readable recording medium as computer-readable code or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable code may be stored and executed in a distributed scheme. The medium may be readable by a computer, stored in a memory, and executed on a processor.

The present embodiment may be represented by functional block configurations and various processing operations. These functional blocks may be implemented by various numbers of hardware and/or software components that execute specific functions. For example, the embodiment may employ integrated circuit configurations, such as a memory, processing, logic, and a look-up table, capable of executing various functions by control of one or more microprocessors or other control devices. Similar to executing the components in software programming or software elements, the present embodiment can be implemented in programming or scripting languages such as C, C++, Java, Assembly, and Python including various algorithms implemented by a combination of data structures, processes, routines or other programming configurations. Functional aspects may be implemented in algorithms executed on one or more processors. In addition, the present embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described embodiments are merely examples, and other embodiments may be implemented within the scope of the following claims.

What is claimed is:

1. A method of processing item sales information by an electronic apparatus, the method comprising:
    acquiring a purchase request including item information related to an item selected by a user and information related to a payment means;
    providing a purchase response, the purchase response including approval information when the information related to the payment means satisfies a first condition, the approval information corresponding to the purchase request before proceeding with payment through the payment means;
    determining that process of payment by a second sever is in an unavailable state, the second server corresponding to a first payment method designated based on the payment means;
    determining that the item does not belong to a specific category;
    in response to: i) the information related to the payment means satisfying the first condition, ii) determining that the process of payment by a second sever is in the unavailable state, and iii) determining that the item does not belong to the specific category, transmitting a release request for the item to a first server to cause a fulfillment center to deliver the item to a delivery destination associated with the user;
    determining that the process of payment by the second sever has changed from the unavailable state to an available state;
    in response to determining that the process of payment by the second server has changed to the available state, transmitting, to the second server, a payment request for at least some of an amount corresponding to one or more purchase requests related to the payment means according to an arrival of settlement timing corresponding to the payment means; and
    in response to determining that payment failure information is received from the second server in response to the payment request:
        canceling an approval corresponding to the purchase request;
        providing information including cancellation of the approval; and
        based on receiving, from the first server, information notifying that delivery of the item is in progress or has been completed, transmitting information requesting a return of the item,
    wherein, the specific category comprises a first category including one or more items whose delinquency rate exceeds a preset threshold, and
    wherein the delinquency rate corresponds to a rate of payment not being successful regarding cases that, for each of the one or more items, the electronic apparatus transmitted the release request to the first server while a corresponding server for a payment method was in the unavailable state.

2. The method of claim 1, wherein:
    the item information includes amount information;
    the information related to the payment means includes balance information related to a limit amount of the payment means; and
    the providing of the purchase response includes determining whether the first condition is satisfied based on the amount information and the balance information in response to acquiring the purchase request.

3. The method of claim 1, wherein whether the payment means is usable and a limit amount of the payment means are determined whenever the purchase request is acquired.

4. The method of claim 1, wherein whether the payment means is usable and a limit amount of the payment means are periodically determined according to the arrival of the settlement timing corresponding to the payment means.

5. The method of claim 1, wherein whether the payment means is usable and a limit amount of the payment means are determined based on reliability set in relation to the user.

6. The method of claim 5, wherein the reliability is set based on at least one of: a purchase history corresponding to the user, a membership level corresponding to the user, a subscription period corresponding to the user, a credit score corresponding to the user, or user information acquired from an affiliate.

7. The method of claim 6, wherein the purchase history includes at least one of: a list of one or more items purchased by the user, a payment means used by the user for payment for the one or more items, a product review written by the user, an overdue history of the user related to payment for the one or more items, information related to a delivery destination corresponding to the one or more items, or information related to a terminal used by the user for payment for the one or more items.

8. The method of claim 1, further comprising:
    providing a benefit related to a purchase of the item when the reliability is greater than a preset first value.

9. The method of claim 1, wherein the information related to the payment means does not satisfy the first condition when
    there is no limit amount of the payment means or balance information related to the limit amount is less than an amount corresponding to the purchase request.

10. The method of claim 1, further comprising:
    in response to determining that the information related to the payment means satisfies a second condition after the purchase response including the approval information is provided:
        canceling an approval corresponding to the purchase request; and
        providing information including cancellation of the approval.

11. The method of claim 1, wherein:
    the first payment method corresponds to a transfer based on account information managed by the second server; and
    the payment request corresponds to a request for the second server to transfer an amount requested for the payment based on the account information and transmit payment information including a transfer history of the amount requested for the payment to the electronic apparatus.

12. The method of claim 1, further comprising:
requesting payment for an amount requested for a settlement in response to receiving a settlement request of the user for at least some of the amount corresponding to the one or more purchase requests related to the payment means prior to the settlement timing.

13. The method of claim 1, wherein a user interface (UI) for receiving a settlement request of the user is deactivated during a preset period before and after the settlement timing.

14. A non-transitory computer-readable recording medium storing instructions that, when executed by a computing system, cause the computing system to perform operations comprising:
acquiring a purchase request including item information related to an item selected by a user and information related to a payment means;
providing a purchase response, the purchase response including approval information when the information related to the payment means satisfies a first condition, the approval information corresponding to the purchase request before proceeding with payment through the payment means;
determining that process of payment by a second sever is in an unavailable state, the second server corresponding to a first payment method designated based on the payment means;
determining that the item does not belong to a specific category;
in response to: i) the information related to the payment means satisfying the first condition, ii) determining that the process of payment by a second sever is in the unavailable state, and iii) determining that the item does not belong to the specific category, transmitting a release request for the item to a first server to cause a fulfillment center to deliver the item to a delivery destination associated with the user;
determining that the process of payment by the second sever has changed from the unavailable state to an available state;
in response to determining that the process of payment by the second server has changed to the available state, transmitting, to second server, a payment request for at least some of an amount corresponding to one or more purchase requests related to the payment means according to an arrival of settlement timing corresponding to the payment means; and
in response to determining that payment failure information is received from the second server in response to the payment request:
canceling an approval corresponding to the purchase request;
providing information including cancellation of the approval; and
based on receiving, from the first server, information notifying that delivery of the item is in progress or has been completed, transmitting information requesting a return of the item,
wherein, the specific category comprises a first category including one or more items whose delinquency rate exceeds a preset threshold, and
wherein the delinquency rate corresponds to a rate of payment not being successful regarding cases that, for each of the one or more items, the electronic apparatus transmitted the release request to the first server while a corresponding server for a payment method was in the unavailable state.

15. An electronic apparatus for processing item sales information, the electronic apparatus comprising:
a transceiver;
a memory in which instructions are stored; and
a processor,
wherein the processor is connected to the transceiver and the memory and configured to:
acquire a purchase request including item information related to an item selected by a user and information related to a payment means;
provide a purchase response, the purchase response including approval information when the information related to the payment means satisfies a first condition, the approval information corresponding to the purchase request before proceeding with payment through the payment means;
determine that process of payment by a second sever is in an unavailable state, the second server corresponding to a first payment method designated based on the payment means;
determine that the item does not belong to a specific category;
in response to: i) the information related to the payment means satisfying the first condition, ii) determining that the process of payment by a second sever is in the unavailable state, and iii) determining that the item does not belong to the specific category, transmit, via the transceiver, a release request for the item to a first server to cause a fulfillment center to deliver the item to a delivery destination associated with the user;
determining that the process of payment by the second sever has changed from the unavailable state to an available state;
in response to determining that the process of payment by the second server has changed to the available state, transmit, to second server a payment request for at least some of an amount corresponding to one or more purchase requests related to the payment means according to an arrival of settlement timing corresponding to the payment means; and
in response to determining that payment failure information is received from the second server in response to the payment request:
cancel an approval corresponding to the purchase request;
provide information including cancellation of the approval; and
based on receiving, from the first server, information notifying that delivery of the item is in progress or has been completed, transmit information requesting a return of the item,
wherein, the specific category comprises a first category including one or more items whose delinquency rate exceeds a preset threshold, and
wherein the delinquency rate corresponds to a rate of payment not being successful regarding cases that, for each of the one or more items, the electronic apparatus transmitted the release request to the first server while a corresponding server for a payment method was in the unavailable state.

* * * * *